(12) United States Patent
Hu et al.

(10) Patent No.: US 12,370,693 B1
(45) Date of Patent: Jul. 29, 2025

(54) METHOD FOR POSITIONING IN-OIL INSPECTION ROBOT FOR STORAGE TANK BOTTOM PLATE, APPARATUS, MEDIUM AND PRODUCT

(71) Applicant: China Special Equipment Inspection & Research Institute, Beijing (CN)

(72) Inventors: Bin Hu, Beijing (CN); Xiyue Zou, Beijing (CN); Xiqing Liu, Beijing (CN); Yan Zhang, Beijing (CN); Ting Wang, Beijing (CN); Zhiquan Wang, Beijing (CN); Chenxing Jia, Beijing (CN)

(73) Assignee: China Special Equipment Inspection & Research Institute, Beijing (CN)

( * ) Notice: Subject to any disclaimer, the term of this patent is extended or adjusted under 35 U.S.C. 154(b) by 0 days.

(21) Appl. No.: 19/192,479

(22) Filed: Apr. 29, 2025

(30) Foreign Application Priority Data

May 6, 2024 (CN) .......................... 202410544303.3

(51) Int. Cl.
*B25J 9/16* (2006.01)
*B25J 11/00* (2006.01)

(52) U.S. Cl.
CPC .......... *B25J 11/008* (2013.01); *B25J 9/1664* (2013.01); *B25J 9/1679* (2013.01)

(58) Field of Classification Search
CPC ....... B25J 11/008; B25J 9/1664; B25J 9/1679
See application file for complete search history.

(56) References Cited

U.S. PATENT DOCUMENTS

| | | | |
|---|---|---|---|
| 2012/0281096 A1 * | 11/2012 | Gellaboina | ............. G01S 15/88 342/179 |
| 2021/0048821 A1 * | 2/2021 | Bondurant | ............... G05D 1/10 |

FOREIGN PATENT DOCUMENTS

| | | |
|---|---|---|
| CN | 109490831 A | 3/2019 |
| CN | 113885030 A | 1/2022 |
| CN | 114441422 A | 5/2022 |

* cited by examiner

*Primary Examiner* — Robert T Nguyen
(74) *Attorney, Agent, or Firm* — Bayramoglu Law Offices LLC (57) ABSTRACT

A method for positioning an in-oil inspection robot for a storage tank bottom plate, an apparatus, a medium and a product are provided. The method includes: selecting those of acoustic signal receivers that generate voltage amplitudes, when receiving an acoustic signal, being greater than a predetermined voltage amplitude as available receivers, calculating a difference between an absolute arrival time corresponding to the available receiver and an absolute arrival time corresponding to an available receiver ranked first to obtain a relative arrival time corresponding to the available receiver; and positioning the in-oil inspection robot for the storage tank bottom plate further according to the relative arrival time.

15 Claims, 3 Drawing Sheets

---

Acquiring a voltage amplitude generated by each of a plurality of acoustic signal receivers installed on an outer wall of a storage tank when receiving an acoustic signal; and for each acoustic signal receiver, determining whether the voltage amplitude generated by the acoustic signal receiver when receiving the acoustic signal is greater than a predetermined voltage amplitude, and in response to determining that the voltage amplitude generated by the acoustic signal receiver when receiving the acoustic signal is greater than the predetermined voltage amplitude, selecting the acoustic signal receiver as an available receiver — S1

Acquiring absolute arrival times when the acoustic signal arrives at respective available receivers to obtain an absolute arrival time corresponding to each available receiver; ranking all available receivers in an ascending order of the absolute arrival times, and for each available receiver, calculating a difference between an absolute arrival time corresponding to the available receiver and an absolute arrival time corresponding to the available receiver ranked first to obtain a relative arrival time corresponding to the available receiver — S2

Positioning the in-oil inspection robot for the storage tank bottom plate based on installation positions and relative arrival times corresponding to all available receivers — S3

FIG. 3 understand # METHOD FOR POSITIONING IN-OIL INSPECTION ROBOT FOR STORAGE TANK BOTTOM PLATE, APPARATUS, MEDIUM AND PRODUCT

CROSS-REFERENCE TO THE RELATED APPLICATIONS

This application is based upon and claims priority to Chinese Patent Application No. 202410544303.3, filed on May 6, 2024, the entire contents of which are incorporated herein by reference.

TECHNICAL FIELD

The present disclosure relates to the technical field of acoustic positioning, and in particular to a method for acoustically positioning a free measuring point for an in-oil inspection robot for a storage tank bottom plate, an apparatus, a medium and a product.

BACKGROUND

In the field of petrochemical industry, a large vertical storage tank is a metal storage tank for storing crude oil and refined oil, which has a diameter generally ranging from a dozen meters to tens of meters. The storage median in the storage tank generally has characteristics such as flammable, explosive and corrosive, which brings great challenges to the inspection and maintenance of storage tanks. As the most seriously corroded area in the storage tank, the storage tank bottom plate is particularly important in terms of inspection. The existing inspection methods usually carry out manual bottom plate inspection after cleaning the tank regularly. However, problems such as storage medium transfer and sediment cleaning on the storage tank bottom plate have brought challenges to the inspection of the storage tank bottom plate. With the development of technology, the robot inspection technology is constantly being applied to the inspection of the storage tank bottom plate. An in-oil inspection robot for a storage tank bottom plate has also become a research hotspot at home and abroad. The in-oil inspection robot for the storage tank bottom plate is a robot which is hoisted into the storage medium of the storage tank through a manhole at the top of the storage tank to detect the defects of the bottom plate. The core difficulty is to determine the position of the robot in the storage tank to realize path planning and tracking.

The existing method for positioning an in-oil inspection robot for a storage tank bottom plate includes: propagating the acoustic signal transmitted by the acoustic signal transmitter installed on the in-oil inspection robot for the storage tank bottom plate in the storage medium, receiving the acoustic signal by a plurality of acoustic signal receivers arranged in the circumferential direction of the storage tank, and determining the position of the in-oil inspection robot for the storage tank bottom plate based on the arrival time of the acoustic signal received by the plurality of acoustic signal receivers. Related patents include: Chinese Patent Application No. CN114441422A, which discloses an on-line inspection device of a storage tank bottom plate and a method thereof, in which a robot performs positioning using the combination of three receivers or a plurality of receivers around the storage tank, and the position of the pulse acoustic signal transmitter is determined by a three-point positioning algorithm. Chinese Patent Application No. CN113885030A discloses a method for positioning an inspection robot for an oil-loaded storage tank bottom plate, in which the method does not need to arrange receivers around the storage tank, but performs self-transmitting and self-receiving positioning by receiving echoes from the tank wall. Chinese Patent Application No. CN109490831A discloses a method for positioning for an on-line inspection robot for a storage tank bottom plate and a system thereof, in which an acoustic signal receiver is arranged on the floating roof of the storage tank and is vertically immersed in oil. The common point of the above patents is that positioning is realized by propagating acoustic signals in the storage medium, and the coordinate points of the transmitter are all solved by the absolute arrival time of the acoustic signals received by the receiver. However, the above methods have the following two disadvantages. (1) There is a delay in the process from the system issuing the excitation request of the acoustic signals to the pulse acoustic signal transmitter actually issuing the acoustic signals, so that the measured distance between the receiver and the transmitter will be greater than the real value. The error depends on the response speed of the system, which is generally between several milliseconds and tens of milliseconds. This will lead to the fact that the arcs of a plurality of circles cannot intersect at one point, and additional methods are required for correction, which will also result in obvious positioning errors. (2) A three-point positioning method is based on the assumption that the weight of each transmitter is equal to each other, without considering that when the robot is far away, the acoustic signal will have a determination error in the receiving time due to amplitude attenuation. When the acoustic signal has a small attenuation, the receiver will receive a signal with a sharp peak, and the propagation time (that is, the absolute arrival time) can be determined by taking the peak. When the acoustic signal has a large attenuation, the sharpness of the peak value of the signal received by the receiver will decrease with obvious noise disturbance. Therefore, it will be difficult to determine the propagation time and lead to positioning errors.

SUMMARY

The present disclosure aims to provide a method for positioning an in-oil inspection robot for a storage tank bottom plate, an apparatus, a medium and a product, which can improve the positioning accuracy and solve the problem that the existing method for acoustically positioning the in-oil inspection robot for the storage tank bottom plate will cause positioning errors due to delay and attenuation.

In order to achieve the above objectives, the present disclosure provides the following solutions.

The present disclosure relates to a method for positioning an in-oil inspection robot for a storage tank bottom plate, including the following steps:

acquiring a voltage amplitude generated by each of a plurality of acoustic signal receivers installed on an outer wall of a storage tank when receiving an acoustic signal; and for each acoustic signal receiver, determining whether the voltage amplitude generated by the acoustic signal receiver when receiving the acoustic signal is greater than a predetermined voltage amplitude, and in response to determining that the voltage amplitude generated by the acoustic signal receiver when receiving the acoustic signal is greater than the predetermined voltage amplitude, selecting the acoustic signal receiver as an available receiver; wherein the acoustic signal is transmitted by an acoustic signal transmitter installed on the in-oil inspection robot for the storage tank bottom plate;

acquiring absolute arrival times when the acoustic signal arrives at respective available receivers to obtain an absolute arrival time corresponding to each available receiver; ranking all available receivers in an ascending order of the absolute arrival times, and for each available receiver, calculating a difference between an absolute arrival time corresponding to the available receiver and an absolute arrival time corresponding to the available receiver ranked first to obtain a relative arrival time corresponding to the available receiver; and positioning the in-oil inspection robot for the storage tank bottom plate based on installation positions and relative arrival times corresponding to all available receivers.

In some embodiments, positioning the in-oil inspection robot for the storage tank bottom plate based on installation positions and relative arrival times corresponding to all available receivers includes: establishing an objective function based on the installation positions and the relative arrival times corresponding to all available receivers; wherein the objective function is $$\varepsilon = \sum_{i=1}^{M} w_i \varepsilon_i;$$

where $\varepsilon$ is an objective function value; M is the total number of the available receivers; $w_i$ is a weight corresponding to the i-th available receiver; $\varepsilon_i$ is a distance error corresponding to the i-th available receiver, which is determined based on the installation positions and the relative arrival times corresponding to all available receivers; and optimizing and solving the objective function to obtain position information of the in-oil inspection robot for the storage tank bottom plate, to position the in-oil inspection robot for the storage tank bottom plate.

In some embodiments, the weight corresponding to the i-th available receiver is determined based on a voltage amplitude generated by the i-th available receiver when receiving the acoustic signal.

In some embodiments, a formula for calculating the distance error corresponding to the i-th available receiver is $\varepsilon_i = |(x-x_i)^2 + (y-y_i)^2 - (d_1 + d_{1i})^2|$; where x is an x coordinate of the in-oil inspection robot for the storage tank bottom plate; $x_i$ is an x coordinate of the i-th available receiver; y is a y coordinate of the in-oil inspection robot for the storage tank bottom plate; $y_i$ is a y coordinate of the i-th available receiver; $d_1$ is a distance from the available receiver ranked first to the in-oil inspection robot for the storage tank bottom plate; and $d_{1i}$ is a received distance difference between the i-th available receiver and the available receiver ranked first, which is determined based on a relative arrival time corresponding to the i-th available receiver.

In some embodiments, optimizing and solving the objective function includes: optimizing and solving the objective function using a particle swarm optimization algorithm.

In some embodiments, optimizing and solving the objective function using a particle swarm optimization algorithm includes: acquiring a plurality of initial particles to obtain an initial swarm; wherein each of the initial particles includes the x coordinate of the in-oil inspection robot for the storage tank bottom plate, the y coordinate of the in-oil inspection robot for the storage tank bottom plate, and a value of the distance from the available receiver ranked first to the in-oil inspection robot for the storage tank bottom plate; calculating an objective function value of each of the initial particles in the initial swarm based on the objective function; and determining whether an iteration termination condition is met; in response to determining that the iteration termination condition is met, determining the position information of the in-oil inspection robot for the storage tank bottom plate based on an initial particle with the minimum objective function value; and in response to determining that the iteration termination condition is not met, updating the initial swarm to obtain an updated swarm, setting the updated swarm as an initial swarm of a next iteration, and returning to the calculating an objective function value of each of the initial particles in the initial swarm based on the objective function.

In some embodiments, the method further includes: after obtaining the position information of the in-oil inspection robot for the storage tank bottom plate, transmitting an acoustic signal again for a next positioning until acoustic signals are transmitted for a plurality of times, and obtaining position information of the in-oil inspection robot for the storage tank bottom plate every time the acoustic signal is transmitted; and determining an optimized position based on the position information obtained from each positioning, and setting the optimized position as a final position to position the in-oil inspection robot for the storage tank bottom plate.

Determining an optimized position based on the position information obtained from each positioning includes: calculating an average value of the position information obtained from each positioning to obtain an average position; for the position information obtained from each positioning, calculating a distance between the position information and the average position, determining whether the distance is greater than a predetermined distance, and in response to determining that the distance is less than or equal to the predetermined distance, setting the position information as an available position; and calculating an average value of all available positions to obtain the optimized position.

A computer apparatus is provided, including: a memory, a processor and a computer program stored in the memory and executable on the processor, wherein the processor is configured to execute the computer program to implement steps of the method for positioning the in-oil inspection robot for the storage tank bottom plate described above.

A computer-readable storage medium is provided, having a computer program stored therein, wherein the computer program, when executed by a processor, implements steps of the method for positioning the in-oil inspection robot for the storage tank bottom plate described above.

A computer program product is provided, including a computer program, wherein the computer program, when executed by a processor, implements steps of the method for positioning the in-oil inspection robot for the storage tank bottom plate described above.

According to the specific embodiments provided by the present disclosure, the present disclosure discloses the following technical effects.

The present disclosure provides a method for positioning an in-oil inspection robot for a storage tank bottom plate, an apparatus, a medium and a product. The method includes: selecting those of a plurality of acoustic signal receivers installed on an outer wall of a storage tank that generate voltage amplitudes, when receiving an acoustic signal, being greater than a predetermined voltage amplitude as available receivers; ranking all available receivers in an ascending order of the absolute arrival time corresponding to each available receiver; calculating a difference between an absolute arrival time corresponding to the available receiver and an absolute arrival time corresponding to the available receiver ranked first to obtain a relative arrival time corresponding to the available receiver; and positioning the in-oil inspection robot for the storage tank bottom plate based on installation positions and relative arrival times corresponding to all available receivers. By introducing the relative arrival time and positioning the in-oil inspection robot according to the relative arrival time, the problem resulted from signal delay can be solved. At the same time, the acoustic signal receivers are screened according to the voltage amplitude, the available receivers with a small attenuation and a high accuracy are selected for positioning to improve the accuracy, which can solve the problems resulted from signal attenuation, thus improving the positioning accuracy and solving the problem that the existing method for acoustically positioning the in-oil inspection robot for the storage tank bottom plate will cause positioning errors due to delay and attenuation.

BRIEF DESCRIPTION OF THE DRAWINGS

In order to explain the technical solution in the embodiments of the present disclosure or the prior art more clearly, the drawings needed in the embodiments will be briefly introduced hereinafter. Obviously, the drawings described below are only some embodiments of the present disclosure. Other drawings can be obtained according to these drawings without paying creative labor for those skilled in the art.

DETAILED DESCRIPTION OF THE EMBODIMENTS

The technical solution in the embodiments of the present disclosure will be clearly and completely described with reference to the drawings hereinafter. Obviously, the described embodiments are only some embodiments of the present disclosure, rather than all of the embodiments. Based on the embodiments in the present disclosure, all other embodiments obtained by those skilled in the art without paying creative labor belong to the scope of protection of the present disclosure.

The present disclosure aims to provide a method for positioning an in-oil inspection robot for a storage tank bottom plate, an apparatus, a medium and a product, which can improve the positioning accuracy and solve the problem that the existing method for acoustically positioning the in-oil inspection robot for the storage tank bottom plate will cause positioning errors due to delay and attenuation.

In order to enable the above objects, features and advantages of the present disclosure to be more obvious and understandable, the present disclosure will be further described in detail with reference to the drawings and the detailed description.

Embodiment 1

Figure 1:
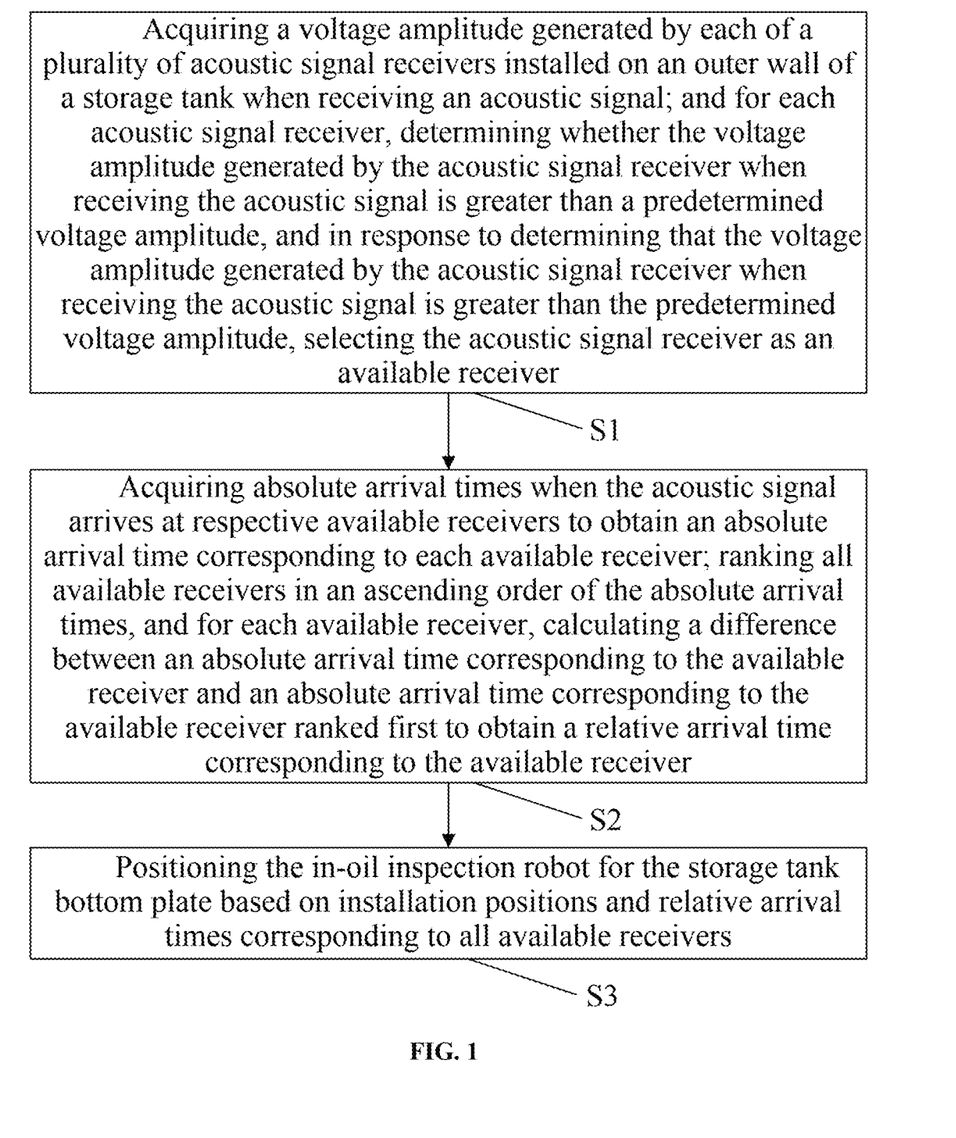
FIG. 1 is a schematic flow chart of a method for positioning an in-oil inspection robot for a storage tank bottom plate according to Embodiment 1 of the present disclosure.

As shown in FIG. 1, a method for positioning an in-oil inspection robot for a storage tank bottom plate in this embodiment includes the following steps.

In step S1, a voltage amplitude generated by each of a plurality of acoustic signal receivers installed on an outer wall of a storage tank when receiving an acoustic signal is acquired; and for each acoustic signal receiver, it is determined whether the voltage amplitude generated by the acoustic signal receiver when receiving the acoustic signal is greater than a predetermined voltage amplitude, and if so, the acoustic signal receiver is selected as an available receiver. The acoustic signal is transmitted by an acoustic signal transmitter installed on the in-oil inspection robot for the storage tank bottom plate.

The in-oil inspection robot for the storage tank bottom plate carries an acoustic signal transmitter. The acoustic signal transmitter may be a pulse signal transmitter, which can continuously transmit acoustic signals during the moving process. The acoustic signals propagate through the storage medium in the storage tank and are received by a plurality of acoustic signal receivers arranged in the circumferential direction of the storage tank wall.

Figure 2:
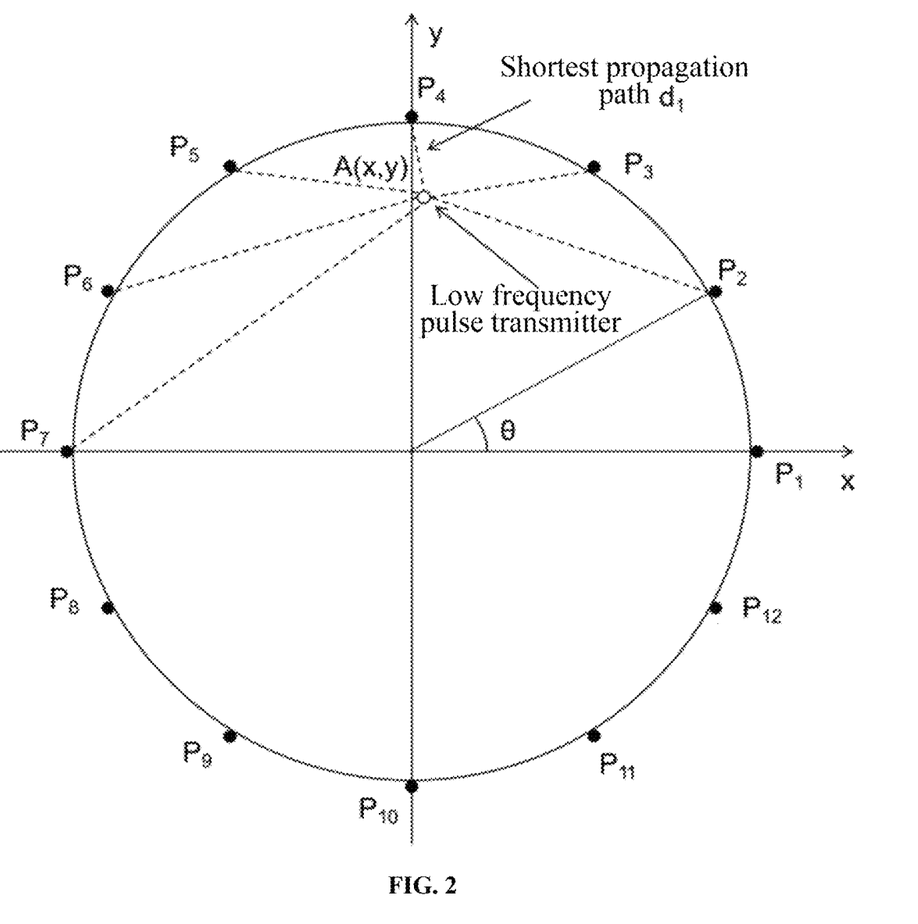
FIG. 2 is a schematic diagram of installation of acoustic signal receivers according to Embodiment 1 of the present disclosure.

As shown in FIG. 2, in this embodiment, the acoustic signal receivers are arranged first. It is assumed that the radius of the storage tank is R, the direction that the operator faces is selected as the +y axis, the direction perpendicular to the +y axis and pointing toward right side is taken as the +x axis, and the center of the storage tank is taken as the origin (0,0) to establish the x-y coordinate system. The acoustic signal receivers in this embodiment are all arranged in the circumferential direction of the storage tank wall. The acoustic signal receivers can be arranged to be spaced apart from each other at an angle interval of θ, and a total of N acoustic signal receivers may be arranged, where θ may be less than or equal to 45 degrees, N may be greater than or equal to 8, and the included angle between each acoustic signal receiver and the +x axis is at. According to the relative position, the coordinates of the acoustic signal receiver are determined. The coordinates of the acoustic signal receivers are the installation positions of the acoustic signal receivers, which are $P_1(x_1,y_1)$, $P_2(x_2,y_2)$, ..., $P_N(x_N,Y_N)$ in sequence counterclockwise, where N is the total number of acoustic signal receivers. The coordinates of each acoustic signal receiver can be expressed as the following formula (1).

$$x_i = R \cos \alpha_i, \ y_i = R \sin \alpha_i \quad (1)$$

In formula (1), $x_i$ is the x coordinate of the i-th acoustic signal receiver; R is a radius of the storage tank; $\alpha_i$ is an included angle between the i-th acoustic signal receiver and the +x axis, and $$\alpha_i = \frac{2\pi}{\theta};$$

and $y_i$ is a y coordinate of the i-th acoustic signal receiver.

After the acoustic signal receivers are arranged, the leads of the acoustic signal receivers are gathered at the acquisition card of the main control computer, or signals and data with system time stamps are sent to the main control computer in the form of wireless transceiver nodes to realize the communication process between the acoustic signal receivers and the main control computer, which is convenient for the main control computer to acquire the absolute arrival times when the acoustic signal is received by the acoustic signal receivers (that is, the acoustic signal arrives at the acoustic signal receivers).

The main control computer and the acoustic signal receiver can transmit information by wireless signal transmission, but the problem of time synchronization in different places needs to be solved. The main control computer is connected with one wireless transceiver as a time reference and an upper node. Each of the acoustic signal receivers is connected with an acquisition card, the acquisition card is connected with a microcomputer, and the microcomputer is connected with a wireless transceiver as a lower node. There is a time calibration protocol between the main control computer and the acoustic signal receiver, in which: ① the main control computer periodically sends time calibration requests to each of the acoustic signal receivers in sequence; ② the acoustic signal receiver returns to the local time after receiving the signal; ③ after receiving the reply, the main control computer compares its own time with the local time of the acoustic signal receiver, and returns the compared error to the acoustic signal receiver; ④ after receiving the second return signal, the acoustic signal receiver corrects the local time according to the error. When the positioning acoustic signal is transmitted to the acoustic signal receiver, the microcomputer analyzes the signal acquired by the acquisition card and sends, to the main control computer, the local time of the acoustic signal receiver at which the positioning acoustic signal is received, so that the main control computer obtains the absolute arrival time corresponding to each of the acoustic signal receivers. Wireless transmission avoids the problems of difficult wiring and complex line sequences, but requires the clock synchronization between nodes to be accurate to less than 10 milliseconds.

The in-oil inspection robot for the storage tank bottom plate is loaded with one or more acoustic signal transmitters. After the in-oil inspection robot for the storage tank bottom plate is hoisted into the storage tank from the manhole at the top of the storage tank, one of the acoustic signal transmitters is activated, and the activated acoustic signal transmitter transmits an acoustic signal. According to the radius of the storage tank and different positions of the in-oil inspection robot for the storage tank bottom plate, after several milliseconds to several tens of milliseconds, the acoustic signal will arrive at each of the acoustic signal receivers in sequence. When the acoustic signal arrives at the i-th acoustic signal receiver, the voltage amplitude of the i-th acoustic signal receiver will generate a peak. When the voltage amplitude of the i-th acoustic signal receiver is the peak, it means that the i-th acoustic signal receiver has received the acoustic signal. The peak is the voltage amplitude generated when the i-th acoustic signal receiver receives the acoustic signal. At the same time, the time here is denoted as the absolute arrival time $t_i$ when the acoustic signal arrives at the i-th acoustic signal receiver to determine the absolute time when each of the acoustic signal receivers receives the acoustic signal, that is, determine the absolute arrival time corresponding to each of the acoustic signal receivers.

At the same time, considering the attenuation problem of the acoustic signals, it is determined whether the voltage amplitude generated by the acoustic signal receiver when receiving the acoustic signal is greater than the predetermined voltage amplitude, if so, the acoustic signal receiver is selected as the available receiver. That is, if the voltage amplitude generated by the i-th acoustic signal receiver when receiving the acoustic signal exceeds the predetermined voltage amplitude, the i-th acoustic signal receiver is selected as the available receiver, and the number of acoustic signal receivers exceeding the predetermined voltage amplitude is denoted as M, so that the total number of available receivers is M.

In step S2, absolute arrival times when the acoustic signal arrives at respective available receivers are acquired to obtain an absolute arrival time corresponding to each available receiver; all of the available receivers are ranked in an ascending order of the absolute arrival times, and for each available receiver, a difference between an absolute arrival time corresponding to the available receiver and an absolute arrival time corresponding to the available receiver ranked first is calculated to obtain a relative arrival time corresponding to the available receiver.

The absolute arrival times $t_1$ to $t_M$ are ranked in an ascending order, and the ranking result is $t'_1$ to $t'_M$, where the available receiver corresponding to $t'_1$ is closest to the in-oil inspection robot for the storage tank bottom plate, and the relative arrival times corresponding to each available receiver are $t_{r1}=(t'_1-t'_1)$, $t_{r2}=(t'_2-t'_1)$, $t_{r3}=(t'_3-t'_1)$, ..., $t_{rM}=(t'_M-t'_1)$.

In step S3, the in-oil inspection robot for the storage tank bottom plate is positioned based on installation positions and relative arrival times corresponding to all of the available receivers.

After determining the relative arrival time, the received distance difference can be calculated. The available receiver corresponding to $t'_1$ is closest to the in-oil inspection robot for the storage tank bottom plate, and the distance is $d_1$. $d_1$ is an unknown value. Assuming that the sound speed in the current storage medium is v, the received distance differences between each available receiver and the available receiver ranked first are $d_{11}=v(t'_1-t'_1)$, $d_{12}=v(t'_2-t'_1)$, $d_{13}=v(t'_3-t'_1)$, ..., and $d_{1M}=v(t'_M-t'_1)$ in sequence.

Assuming that the position where the acoustic signal is transmitted (that is, the position of the in-oil inspection robot for the storage tank bottom plate) is A (x, y), which is an unknown value. Based on the transmission law of the acoustic signal, the acoustic signal positioning equation set is listed as follows, including M equations, as shown in the following formula (2).

$$\begin{cases} (x-x_1)^2 + (y-y_1)^2 = (d_1+d_{11})^2 \\ (x-x_2)^2 + (y-y_2)^2 = (d_1+d_{12})^2 \\ \quad \vdots \\ (x-x_M)^2 + (y-y_M)^2 = (d_1+d_{1M})^2 \end{cases} \quad (2)$$

In formula (2), x is an x coordinate of the in-oil inspection robot for the storage tank bottom plate; $x_i$ is an x coordinate of the i-th available receiver (i.e., the available receiver ranked at i), where i=1, 2, ..., M; y is a y coordinate of the in-oil inspection robot for the storage tank bottom plate; $y_i$ is a y coordinate of the i-th available receiver; d is a distance from the available receiver ranked first to the in-oil inspection robot for the storage tank bottom plate, which is an unknown value; and $d_{1i}$ is a received distance difference between the i-th available receiver and the available receiver ranked first, that is, the difference between the distance from the i-th available receiver to the acoustic signal transmitter and the distance from the first available receiver to the acoustic signal transmitter, which is determined according to the relative arrival time corresponding to the i-th available receiver, in which $d_{1i}=v(t'_i-t'_1)$, $t'_i$ is the relative arrival time corresponding to the i-th available receiver, and when i=1, $d_{11}=0$. According to the number of unknowns, it can be seen that at least three available receivers are needed to determine the position of the acoustic signal transmitter. After the number of equations is more than three, an overdetermined equation set will be formed, and the acoustic signal positioning equation set needs to have a unique solution by adding restrictions.

By solving the acoustic signal positioning equation set, the position information (x, y) of the in-oil inspection robot for the storage tank bottom plate can be obtained.

In this embodiment, in order to solve the above-mentioned overdetermined problem, the solution of the acoustic signal positioning equation set is converted into an optimization problem, and then the in-oil inspection robot for the storage tank bottom plate is positioned based on the installation positions and the relative arrival times corresponding to all of the available receivers, specifically including the following steps.

(1) an objective function is established based on the installation positions and the relative arrival times of all of the available receivers.

The objective function is shown in the following formula (3).

$$\varepsilon = \sum_{i=1}^{M} w_i \varepsilon_i \quad (3)$$

In formula (3), $\varepsilon$ is an objective function value; M is the total number of available receivers; $w_i$ is a weight corresponding to the i-th available receiver; $\varepsilon_i$ is a distance error corresponding to the i-th available receiver, which is determined based on the installation positions and the relative arrival times corresponding to all of the available receivers.

The weight corresponding to the i-th available receiver is determined based on the voltage amplitude generated by the i-th available receiver when receiving the acoustic signal, that is, the weight $w_i$ is a non-increasing function of the voltage amplitude when receiving the acoustic signal. That is, the lower the signal attenuation degree, the higher the voltage amplitude and the higher the weight, which is denoted as the following formula (4).

$$w_i = f(V_{i,max}) \quad (4)$$

In formula (4), $V_{i,max}$ is the voltage amplitude when the i-th available receiver receives the acoustic signal.

The function of the above weights can be defined according to requirements. As an example, in this embodiment, the function of the weight is shown in the following formula (5).

$$\begin{cases} w_i = 1, & \text{when } V_{max,i} \geq V_{th} \\ w_i = \dfrac{V_{max,i}}{V_{max,1}} & \text{when } V_{max,i} < V_{th} \end{cases} \quad (5)$$

In formula (5), Vth is a predetermined threshold; $V_{max,1}$ is a voltage amplitude generated by the available receiver ranked first when receiving the acoustic signal. The formula (5) means that when the generated voltage amplitude is higher than the predetermined threshold value Vth, it is considered that the voltage amplitude is completely accurate with a weight of 1. Otherwise, the weight is the ratio of the voltage amplitude generated by the available receiver when receiving the acoustic signal to the voltage amplitude generated by the available receiver ranked first when receiving the acoustic signal.

The formula for calculating the distance error corresponding to the i-th available receiver is shown in the following formula (6).

$$\varepsilon_i = |(x-x_i)^2 + (y-y_i)^2 - (d_1+d_{1i})^2| \quad (6)$$

In formula (6), x is an x coordinate of the in-oil inspection robot for the storage tank bottom plate; $x_i$ is an x coordinate of the i-th available receiver; y is a y coordinate of the in-oil inspection robot for the storage tank bottom plate; $y_i$ is a y coordinate of the i-th available receiver; $d_1$ is a distance from the available receiver ranked first to the in-oil inspection robot for the storage tank bottom plate; and $d_{1i}$ is a received distance difference between the i-th available receiver and the available receiver ranked first, which is determined based on the relative arrival time corresponding to the i-th available receiver.

(2) the objective function is optimized and solved to obtain position information of the in-oil inspection robot for the storage tank bottom plate to position the in-oil inspection robot for the storage tank bottom plate.

Optimizing and solving the objective function includes: optimizing and solving the objective function using a particle swarm optimization algorithm. Of course, other types of algorithms can also be used for optimizing and solving the objective function.

When the positioning point (that is, the position information of the in-oil inspection robot for the storage tank bottom plate) is solved using the particle swarm optimization algorithm, the optimization goal is to minimize the objective function. The particle swarm optimization algorithm is summarized as follows: assuming that several movable particles are scattered in the three-dimensional space, each particle can detect the objective function value of its own position, and after each round of inspection, all particles move to the position with the optimal objective function value until all particles are concentrated in the optimized position. Optimizing and solving the objective function using a particle swarm optimization algorithm includes: acquiring a plurality of initial particles to obtain an initial swarm; wherein each of the initial particles includes an x coordinate of the in-oil inspection robot for the storage tank bottom plate, a y coordinate of the in-oil inspection robot for the storage tank bottom plate, and a value of a distance from the available receiver ranked first to the in-oil inspection robot for the storage tank bottom plate; calculating an objective function value of each of the initial particles in the initial swarm based on the objective function; and determining whether an iteration termination condition is met; if so, determining the position information of the in-oil inspection robot for the storage tank bottom plate based on the initial particle with the minimum objective function value; if not, updating the initial swarm to obtain an updated swarm, taking the updated swarm as the initial swarm of the next iteration, and returning to the Step of "calculating an objective function value of each of the initial particles in the initial swarm based on the objective function".

It is assumed that there are P movable particles (i.e. initial particles) randomly distributed in the three-dimensional space A, and the value of the k-th particle is $X_k(x_k, y_k, l_k)$, which are three unknowns in the equation set, where $x_k$, $y_k$ is a two-dimensional coordinate (i.e. position information) of the in-oil inspection robot for the storage tank bottom plate represented by the k-th particle. $l_k$ is the distance $d_1$ from the two-dimensional coordinate represented by the k-th particle to the first available receiver. $X_k$ satisfies the equation set shown in the following formula (7).

$$\begin{cases} x_k^2 + y_k^2 < R^2 \\ l_k \leq R \end{cases} \quad (7)$$

In formula (7), R is the radius of the storage tank.

Each particle carries a certain initial speed with a value having a certain disturbance, which can be denoted as the following formula (8).

$$v_{k,0} = r_v v_0 \qquad (8)$$

In formula (8), $v_{k,0}$ is the initial speed of the k-th particle; $r_v$ is a random number from 0 to 1; and $v_0$ is a base speed.

After calculating the objective function value of each of the initial particles, the global optimal value and the individual optimal value of each particle can be calculated, in which the objective function value of each particle at the current position is calculated, the value corresponding to the minimum value of the objective function value is searched in historical data generated for each particle itself in multiple iterations, to obtain the individual optimal value of each particle, which is denoted as $p_{best,k}$; and the value corresponding to the minimum value of the objective function value is searched in all historical data generated for all particles in multiple iterations, to obtain the global optimal value, which is denoted as $g_{best}$.

When determining the convergence of the particle swarm (i.e., the initial swarm), the radius of the particle swarm, i.e., the radius of the three-dimensional sphere of the particle swarm distributed in the three-dimensional space A, is calculated. When the radius of the swarm satisfies the relationship shown in the following formula (9), it is considered that the optimal particle has been found. At this time, it is considered that the iteration termination condition has been reached, and the iteration ends.

$$r = \sqrt{(x_{best} - x_{worse})^2 + (y_{best} - y_{worse})^2 + (l_{best} - l_{worse})^2} < \epsilon \qquad (9)$$

In formula (9), r is the radius of the swarm; $x_{best}$ is an x coordinate in the global optimal value; $x_{worse}$ is an x coordinate in the worst particle $g_{worse}$ corresponding to the maximum value of the objective function value in the particle swarm; $y_{best}$ is a y coordinate in the global optimal value; $y_{worse}$ is a y coordinate in the worst particle $g_{worse}$ corresponding to the maximum value of the objective function value in the particle swarm; $l_{best}$ is the distance in the global optimal value; $l_{worse}$ is the distance in the worst particle $g_{worse}$ corresponding to the maximum value of the objective function value in the particle swarm; and E is an allowable error, which may be 1 mm.

The iteration termination condition of this embodiment is that the above formula (9) holds. Of course, other iteration termination conditions, such as reaching the maximum number of iterations, can be selected as required.

If the iteration termination condition is not reached, the particle swarm needs to be updated, and the speed and the position of the particle swarm need to be updated. For each particle, its speed is updated at the current position, and it moves for a certain distance at a new speed. The speed after the (t+1)-th update is shown in the following formula (10).

$$v_{k,t+1} = w v_{k,t} + c_1 r_1 (P_{best,k,t} - X_{k,t}) + c_2 r_2 (g_{best,t} - X_{k,t}) \qquad (10)$$

In formula (10), $v_{k,t+1}$ is the speed of the k-th particle in the (t+1)-th round; w is an inertia parameter, that is, the ability of the particle to maintain the current speed; $v_{k,t}$ is the speed of the k-th particle in the t-th round; $c_1$ and $c_2$ are the influences of the individual optimal value and the global optimal value on the change in the particle speed, respectively; $r_1$ and $r_2$ are random parameters; $p_{best,k,t}$ is an individual optimal value of the k-th particle in the t-th round; $X_{k,t}$ is the value of the k-th particle in the t-th round; $g_{best,t}$ is a global optimal value in the t-th round; and w, $c_1$, $c_2$, $r_1$ and $r_2$ are each less than 1.

Because the acoustic positioning algorithm is easily influenced by the environmental noise, and the noise may be resulted from sudden reasons such as people walking on the top of the tank and falling objects, resulting in abnormal deviation of the positioning point, it is necessary to exclude such positioning points. The specific methods are as follows. First, a point set is determined for T times of continuous positioning, and the arithmetic average value of the point set is calculated, which is denoted as $\overline{A}$. Thereafter, the distance $b_i$ from each positioning point to the average value is calculated. If the distance from a positioning point $A_i$ to $\overline{A}$ exceeds the allowable maximum deviation $b_{torr}$, the positioning point is considered as an abnormal positioning point, so as to eliminate the abnormal positioning point. Finally, after all the abnormal positioning points are eliminated, the average value $\overline{A}$ of the remaining positioning points is continuously calculated. Because the movement speed of the inspection robot for the storage tank is less than 5 cm/s, the speed of the positioning point is about tens of milliseconds per point, and the sampling rate is high, $\overline{A}$ calculated after eliminating all abnormal points can be taken as the final position of the in-oil inspection robot for the storage tank bottom plate.

Specifically, after obtaining the position information of the in-oil inspection robot for the storage tank bottom plate, the positioning method of this embodiment further includes: transmitting an acoustic signal again for the next positioning until the acoustic signals are transmitted for a plurality of times, and obtaining the position information of an in-oil inspection robot for a storage tank bottom plate every time the acoustic signal is transmitted; determining an optimized position based on the position information obtained from each positioning, and taking the optimized position as the final position for positioning the in-oil inspection robot for the storage tank bottom plate.

Determining an optimized position based on the position information obtained from each positioning includes: calculating an average value of the position information obtained from each positioning to obtain an average position; for the position information obtained from each positioning, calculating a distance between the position information and the average position, determining whether the distance is greater than a predetermined distance, and if not, taking the position information as an available position; and calculating the average value of all of the available positions to obtain an optimized position.

Considering the problem that the existing method for acoustically positioning the in-oil inspection robot for the storage tank bottom plate will cause positioning errors due to delay and attenuation, a new positioning method is urgently needed to improve the positioning accuracy of the existing method. In this embodiment, the problem resulted from the signal transmission delay is solved by calculating the relative arrival time, and the influence of weak acoustic signals on the errors is eliminated by using the methods of screening the voltage amplitude and ranking the acoustic signal arrival times, so as to solve the problem resulted from the signal attenuation, thus providing a new method for reducing the existing acoustic positioning signal error of in-oil inspection robot for the storage tank bottom plate. This method not only can avoid the errors of the signal transmission delay resulted from the use of the absolute arrival time, but also reduce the propagation time judgment error resulted from the attenuation of acoustic signals received by the remote receiver.

The positioning method of this embodiment is further described with reference to specific data.

The radius of the storage tank to be detected is 7.5 m. The storage medium is water. The sound speed of acoustic signals in the storage medium is 1500 m/s. The acoustic signal receivers are arranged to be spaced apart from each other at 45 degrees. The included angles between the acoustic signal receivers and the +x axis are 0°, 45°, 90°, . . . , 315°, respectively. The coordinates of each of the acoustic signal receivers are $P_1(7.5, 0)$, $P_2(5.303, 5.303)$, $P_3(0, 7.5)$, . . . , $P_8(5.303, -5.303)$. The height of each acoustic signal receiver is the same as the height of the acoustic signal transmitter.

The acoustic signal transmitter of the in-oil inspection robot for the storage tank bottom plate is located at the centroid of the in-oil inspection robot for the storage tank bottom plate. The excitation frequency is 35 kHz, and the pulse voltage amplitude is 300 V. At present, the in-oil inspection robot for the storage tank bottom plate is located at A(3.966, 0.831), and the distance from each of the acoustic signal receivers to the in-oil inspection robot for the storage tank bottom plate is $d_i$. After the acoustic signal is transmitted, the time when each of the acoustic signal receivers actually receives the acoustic signal is t, and the attenuation coefficient of the storage medium is 2.5 dB/m/MHz. When the acoustic signal arrives at the acoustic signal receivers, the pulse peak value (i.e. voltage amplitude) received by each of the acoustic signal receivers is $V_{max}$. See Table 1 below for each parameter.

TABLE 1

Parameters of Each Acoustic Signal Receiver

| | $P_1$ | $P_2$ | $P_3$ | $P_4$ | $P_5$ | $P_6$ | $P_7$ | $P_8$ |
|---|---|---|---|---|---|---|---|---|
| Included angle α (°) | 0 | 45 | 90 | 135 | 180 | 225 | 270 | 315 |
| Distance $d_i$ (m) | 3.63 | 4.668 | 7.759 | 10.291 | 11.496 | 11.115 | 9.227 | 6.279 |
| Absolute arrival time t (ms) | 2.42 | 3.11 | 5.17 | 6.86 | 7.64 | 7.41 | 6.15 | 4.18 |
| Voltage amplitude $V_{max}$ (V) of the received acoustic signal | 1.124 | 1.103 | 1.043 | 1.000 | 0.975 | 0.982 | 1.016 | 1.071 |

The predetermined voltage amplitude is taken as 1 V. Since voltage amplitudes of the acoustic signal receivers $P_5$ and $P_6$ do not exceed the predetermined voltage amplitude, their signals are ignored. The input signal received by the main control computer is the absolute arrival time t, which is ranked in an ascending order of the absolute arrival time, as shown in Table 2 below.

TABLE 2

Parameters of Each Ranked Acoustic Signal Receiver

| | $P'_1$ | $P'_2$ | $P'_3$ | $P'_4$ | $P'_5$ | $P'_6$ |
|---|---|---|---|---|---|---|
| Absolute arrival time t (ms) | 2.42 | 3.11 | 4.18 | 5.17 | 6.15 | 6.86 |
| Receiver number | $P_1$ | $P_2$ | $P_8$ | $P_3$ | $P_7$ | $P_4$ |
| Voltage amplitude $V_{max}$ (V) of the received acoustic signal | 1.124 | 1.103 | 1.071 | 1.043 | 1.016 | 1.000 |
| Relative arrival time $t_r$ (ms) | 0 | 0.692 | 4.186 | 2.752 | 3.73 | 4.44 |
| Received distance difference $d_{1m}$ (m) | 0 | 1.038 | 2.649 | 4.129 | 5.597 | 6.661 |

Thereafter, the objective function is set, and the predetermined threshold value Vth can be set to 1.5 V in the function of the weight in the objective function.

The particle swarm optimization starts. The number of particles is 200. The initial speed of the particle swarm is less than 0.1 m/s. $c_1$ and $c_2$ are both 0.3, and w is 0.9. When the condition that the radius of the swarm is less than 1 mm is satisfied, due to the randomness of iteration, the number of iterations is about 60 to 100, which takes 7 ms to 12 ms. The position of the positioning point is A (3.967, 0.831), which is the same as the actual point.

This embodiment provides a method for positioning an in-oil inspection robot for a storage tank bottom plate. Compared with the existing positioning method, the method has the following advantages. First, the relative arrival time of the acoustic signals is used to calculate the distance, rather than the absolute arrival time, which avoids the positioning error resulted from the system delay. Specifically, there are two unknowns in the positioning equation of the traditional method, that is, plane coordinates x and y, while there are three unknowns in the positioning equation of this method, that is, plane coordinates x and y and the distance $d_1$ from the transmitter to the nearest receiver. Second, considering the influence of the acoustic signal amplitude on the positioning point, the measurement accuracy of the signal propagation distance is improved by excluding weak signals from the far end of the transmitter, and the problems resulted from the signal attenuation are solved. Third, the positioning point calculation for a single time introduces all the signals received by receivers that exceed the threshold, thus avoiding the propagation distance error resulted from noise of a single receiver.

Embodiment 2

A computer apparatus is provided, including: a memory, a processor and a computer program stored in the memory and executable on the processor, wherein the processor is configured to execute the computer program to implement the steps of the method for positioning the in-oil inspection robot for the storage tank bottom plate described in Embodiment 1.

Embodiment 3

A computer-readable storage medium is provided, having a computer program stored therein, wherein the computer program, when executed by a processor, implements the steps of the method for positioning the in-oil inspection robot for the storage tank bottom plate described in Embodiment 1.

Embodiment 4

A computer program product is provided, including a computer program, wherein the computer program, when executed by a processor, implements the steps of the method for positioning the in-oil inspection robot for the storage tank bottom plate described in Embodiment 1.

Embodiment 5

Figure 3:
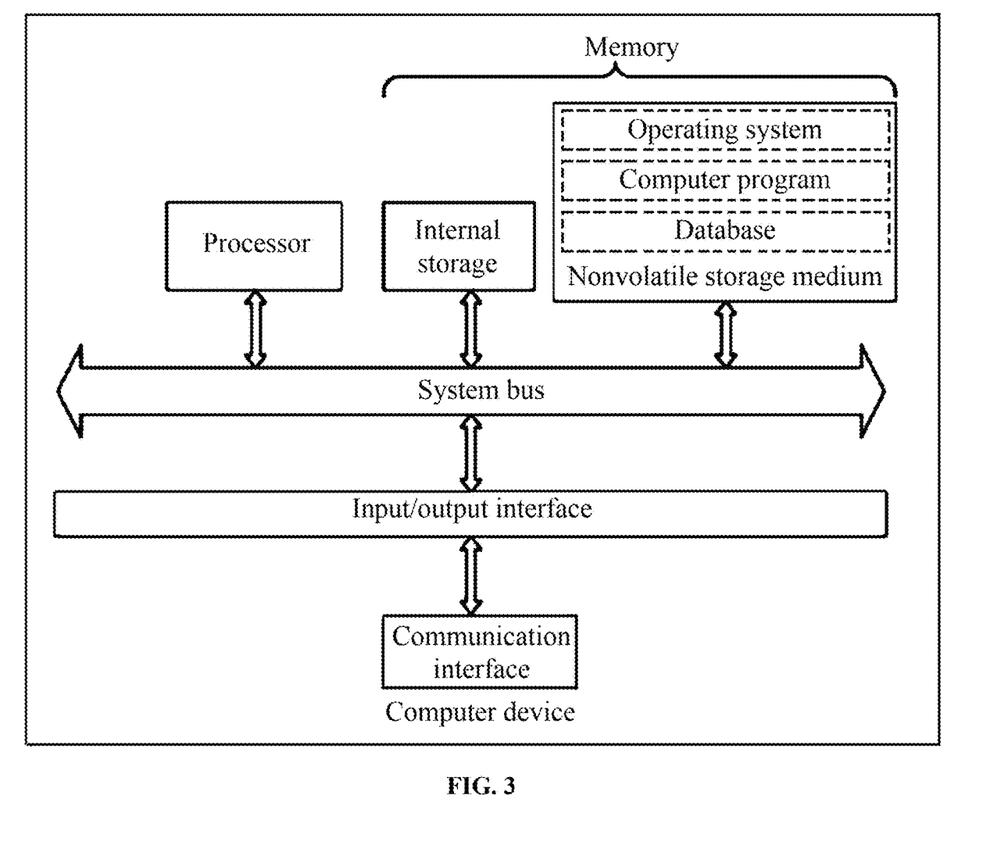
FIG. 3 is an internal structure diagram of a computer device.

A computer device is provided, the computer device may be a database, and its internal structure diagram may be shown in FIG. 3. The computer device includes a processor, a memory, an Input/Output (I/O) interface and a communication interface. The processor, the memory and the input/output interface are connected through the system bus. The communication interface is connected to the system bus through the input/output interface. The processor of the computer device is configured to provide computing and control capabilities. The memory of the computer device includes a nonvolatile storage medium and an internal storage. The nonvolatile storage medium stores an operating system, a computer program and a database. The internal storage provides an environment for the operation of the operating system and the computer program in the nonvolatile storage medium. The database of the computer device is configured to store pending transactions. The input/output interface of the computer device is configured to exchange information between the processor and the external device. The communication interface of the computer device is configured to be communicated with an external terminal through network connection. The computer program, when executed by a processor, implements the method for positioning the in-oil inspection robot for the storage tank bottom plate in Embodiment 1.

It should be noted that object information (including but not limited to object device information, object personal information, etc.) and data (including but not limited to data for analysis, stored data, displayed data, etc.) involved in the present disclosure are both information and data authorized by the object or fully authorized by all parties, and the collection, use and processing of relevant data need to comply with relevant laws, regulations and standards of relevant countries and regions.

Those skilled in the art can understand that all or part of the processes implementing the above-mentioned method embodiments can be completed by instructing related hardware through a computer program. The computer program can be stored in a nonvolatile computer-readable storage medium. The computer program, when executed, can include the processes of the above-mentioned method embodiments. Any reference to the memory, the database or other media used in various embodiments provided by the present disclosure may include at least one of a non-volatile memory and a volatile memory. The nonvolatile memory may include a Read-Only Memory (ROM), a magnetic tape, a floppy disk, a flash memory, an optical memory, a high-density embedded nonvolatile memory, a Resistive Random Access Memory (ReRAM), a Magneto-Resistive Random Access Memory (MRAM), a Ferroelectric Random Access Memory (FRAM), a Phase Change Memory (PCM), a graphene memory, etc. The volatile memory may include a Random Access Memory (RAM) or an external cache memory. By way of illustration rather than limitation, there may be various forms of RAMs, such as a Static Random Access Memory (SRAM) or a Dynamic Random Access Memory (DRAM). The database involved in each embodiment provided by the present disclosure may include at least one of a relational database and a non-relational database. The non-relational database may include, but is not limited to, a distributed database based on a blockchain. The processors involved in various embodiments provided by the present disclosure may be general processors, central processing units, graphics processors, digital signal processors, programmable logics, data processing logics based on quantum computing, etc., but are not limited thereto.

The technical features of the above embodiments can be combined at will. In order to make the description concise, not all possible combinations of the technical features in the above embodiments are described. However, as long as there is no contradiction between the combinations of these technical features, the technical features should be considered as the scope described in this specification.

In the present disclosure, specific examples are used to illustrate the principle and the implementation of the present disclosure. The description of the above embodiments is only used to help understand the method and the core idea of the present disclosure. At the same time, for those skilled in the art, there will be changes in the detailed description and the application scope according to the idea of the present disclosure. In summary, the contents of this specification should not be construed as limiting the present disclosure.

What is claimed is:

1. A method for positioning an in-oil inspection robot for a storage tank bottom plate, comprising:
    acquiring a voltage amplitude generated by each of a plurality of acoustic signal receivers installed on an outer wall of a storage tank when receiving an acoustic signal; and for each acoustic signal receiver, determining whether the voltage amplitude generated by the acoustic signal receiver when receiving the acoustic signal is greater than a predetermined voltage amplitude, and in response to determining that the voltage amplitude generated by the acoustic signal receiver when receiving the acoustic signal is greater than the predetermined voltage amplitude, selecting the acoustic signal receiver as an available receiver; wherein the acoustic signal is transmitted by an acoustic signal transmitter installed on the in-oil inspection robot for the storage tank bottom plate;
    acquiring absolute arrival times when the acoustic signal arrives at respective available receivers to obtain an absolute arrival time corresponding to each available receiver; ranking all available receivers in an ascending order of the absolute arrival times, and for each available receiver, calculating a difference between an absolute arrival time corresponding to the available receiver and an absolute arrival time corresponding to the available receiver ranked first to obtain a relative arrival time corresponding to the available receiver; and
    positioning the in-oil inspection robot for the storage tank bottom plate based on installation positions and relative arrival times corresponding to all the available receivers;

wherein the positioning the in-oil inspection robot for the storage tank bottom plate based on installation positions and relative arrival times corresponding to all the available receivers comprises:

establishing an objective function based on the installation positions and the relative arrival times corresponding to all the available receivers; wherein the objective function is $$\varepsilon = \sum_{i=1}^{M} w_i \varepsilon_i,$$

wherein ε is an objective function value; M is a total number of the available receivers; $w_i$ is a weight corresponding to an i-th available receiver; $\varepsilon_i$ is a distance error corresponding to the i-th available receiver, and is determined based on the installation positions and the relative arrival times corresponding to all the available receivers; and optimizing and solving the objective function to obtain position information of the in-oil inspection robot for the storage tank bottom plate, to position the in-oil inspection robot for the storage tank bottom plate;

wherein a formula for calculating the distance error corresponding to the i-th available receiver is $$\varepsilon_i = |(x-x_i)^2 + (y-y_i)^2 - (d_1 + d_{1i})^2|;$$

wherein x is an x coordinate of the in-oil inspection robot for the storage tank bottom plate; $x_i$ is an x coordinate of the i-th available receiver; y is a y coordinate of the in-oil inspection robot for the storage tank bottom plate; $y_i$ is a y coordinate of the i-th available receiver; $d_1$ is a distance from the available receiver ranked first to the in-oil inspection robot for the storage tank bottom plate; and $d_{1i}$ is a received distance difference between the i-th available receiver and the available receiver ranked first, and is determined based on a relative arrival time corresponding to the i-th available receiver.

2. The method according to claim 1, wherein the weight corresponding to the i-th available receiver is determined based on a voltage amplitude generated by the i-th available receiver when receiving the acoustic signal.

3. The method according to claim 1, wherein the optimizing and solving the objective function comprises:
optimizing and solving the objective function using a particle swarm optimization algorithm.

4. The method according to claim 3, wherein the optimizing and solving the objective function using the particle swarm optimization algorithm comprises:
acquiring a plurality of initial particles to obtain an initial swarm; wherein each of the plurality of initial particles comprises the x coordinate of the in-oil inspection robot for the storage tank bottom plate, the y coordinate of the in-oil inspection robot for the storage tank bottom plate, and a value of the distance from the available receiver ranked first to the in-oil inspection robot for the storage tank bottom plate;
calculating an objective function value of each of the plurality of initial particles in the initial swarm based on the objective function; and
determining whether an iteration termination condition is met; in response to determining that the iteration termination condition is met, determining the position information of the in-oil inspection robot for the storage tank bottom plate based on an initial particle with a minimum objective function value; and in response to determining that the iteration termination condition is not met, updating the initial swarm to obtain an updated swarm, setting the updated swarm as an initial swarm of a next iteration, and returning to the calculating the objective function value of each of the plurality of initial particles in the initial swarm based on the objective function.

5. The method according to claim 1, further comprising:
after obtaining the position information of the in-oil inspection robot for the storage tank bottom plate,
transmitting an acoustic signal again for a next positioning until acoustic signals are transmitted for a plurality of times, and obtaining position information of the in-oil inspection robot for the storage tank bottom plate every time the acoustic signal is transmitted; and
determining an optimized position based on the position information obtained from each positioning, and setting the optimized position as a final position to position the in-oil inspection robot for the storage tank bottom plate;
wherein the determining the optimized position based on the position information obtained from each positioning comprises
calculating an average value of the position information obtained from each positioning to obtain an average position;
for the position information obtained from each positioning, calculating a distance between the position information and the average position, determining whether the distance is greater than a predetermined distance, and in response to determining that the distance is less than or equal to the predetermined distance, setting the position information as an available position; and
calculating an average value of all available positions to obtain the optimized position.

6. A non-transitory computer-readable storage medium, having a computer program stored therein, wherein the computer program, when executed by a processor, implements steps of the method according to claim 1.

7. The computer-readable storage medium according to claim 6, wherein the weight corresponding to the i-th available receiver is determined based on a voltage amplitude generated by the i-th available receiver when receiving the acoustic signal.

8. The computer-readable storage medium according to claim 7, wherein the optimizing and solving the objective function comprises:
optimizing and solving the objective function using a particle swarm optimization algorithm.

9. The computer-readable storage medium according to claim 8, wherein the optimizing and solving the objective function using the particle swarm optimization algorithm comprises:
acquiring a plurality of initial particles to obtain an initial swarm; wherein each of the plurality of initial particles comprises the x coordinate of the in-oil inspection robot for the storage tank bottom plate, the y coordinate of the in-oil inspection robot for the storage tank bottom plate, and a value of the distance from the available receiver ranked first to the in-oil inspection robot for the storage tank bottom plate;
calculating an objective function value of each of the plurality of initial particles in the initial swarm based on the objective function; and
determining whether an iteration termination condition is met; in response to determining that the iteration termination condition is met, determining the position information of the in-oil inspection robot for the storage tank bottom plate based on an initial particle with a minimum objective function value; and in response to determining that the iteration termination condition is not met, updating the initial swarm to obtain an updated swarm, setting the updated swarm as an initial swarm of a next iteration, and returning to the calculating the objective function value of each of the plurality of initial particles in the initial swarm based on the objective function.

10. The computer-readable storage medium according to claim 9, wherein the method further comprises: after obtaining the position information of the in-oil inspection robot for the storage tank bottom plate,
- transmitting an acoustic signal again for a next positioning until acoustic signals are transmitted for a plurality of times, and obtaining position information of the in-oil inspection robot for the storage tank bottom plate every time the acoustic signal is transmitted; and
- determining an optimized position based on the position information obtained from each positioning, and setting the optimized position as a final position to position the in-oil inspection robot for the storage tank bottom plate;
- wherein the determining the optimized position based on the position information obtained from each positioning comprises
    - calculating an average value of the position information obtained from each positioning to obtain an average position;
    - for the position information obtained from each positioning, calculating a distance between the position information and the average position, determining whether the distance is greater than a predetermined distance, and in response to determining that the distance is less than or equal to the predetermined distance, setting the position information as an available position; and
    - calculating an average value of all available positions to obtain the optimized position.

11. A computer apparatus, comprising:
a memory,
a processor, and
a computer program, stored in the memory and executable on the processor,
wherein the processor is configured to execute the computer program to implement steps of the method according to claim 1.

12. The computer apparatus according to claim 11, wherein the weight corresponding to the i-th available receiver is determined based on a voltage amplitude generated by the i-th available receiver when receiving the acoustic signal.

13. The computer apparatus according to claim 11, wherein the optimizing and solving the objective function comprises:
optimizing and solving the objective function using a particle swarm optimization algorithm.

14. The computer apparatus according to claim 13, wherein the optimizing and solving the objective function using the particle swarm optimization algorithm comprises:
acquiring a plurality of initial particles to obtain an initial swarm; wherein each of the plurality of initial particles comprises the x coordinate of the in-oil inspection robot for the storage tank bottom plate, the y coordinate of the in-oil inspection robot for the storage tank bottom plate, and a value of the distance from the available receiver ranked first to the in-oil inspection robot for the storage tank bottom plate;
calculating an objective function value of each of the plurality of initial particles in the initial swarm based on the objective function; and
determining whether an iteration termination condition is met; in response to determining that the iteration termination condition is met, determining the position information of the in-oil inspection robot for the storage tank bottom plate based on an initial particle with a minimum objective function value; and in response to determining that the iteration termination condition is not met, updating the initial swarm to obtain an updated swarm, setting the updated swarm as an initial swarm of a next iteration, and returning to the calculating the objective function value of each of the plurality of initial particles in the initial swarm based on the objective function.

15. The computer apparatus according to claim 11, wherein the method further comprises:
after obtaining the position information of the in-oil inspection robot for the storage tank bottom plate,
transmitting an acoustic signal again for a next positioning until acoustic signals are transmitted for a plurality of times, and obtaining position information of the in-oil inspection robot for the storage tank bottom plate every time the acoustic signal is transmitted; and
determining an optimized position based on the position information obtained from each positioning, and setting the optimized position as a final position to position the in-oil inspection robot for the storage tank bottom plate;
wherein the determining the optimized position based on the position information obtained from each positioning comprises
calculating an average value of the position information obtained from each positioning to obtain an average position;
for the position information obtained from each positioning, calculating a distance between the position information and the average position, determining whether the distance is greater than a predetermined distance, and in response to determining that the distance is less than or equal to the predetermined distance, setting the position information as an available position; and
calculating an average value of all available positions to obtain the optimized position.

* * * * *